United States Patent [19]

Kontz

[11] 4,096,620
[45] Jun. 27, 1978

[54] METHOD AND APPARATUS FOR ASSEMBLING A SUPPORT BASE TO THE BOTTOM OF A PLASTIC CONTAINER

[75] Inventor: Robert F. Kontz, Toledo, Ohio

[73] Assignee: Owens-Illinois, Inc., Toledo, Ohio

[21] Appl. No.: 757,415

[22] Filed: Jan. 6, 1977

[51] Int. Cl.² .............................................. B23P 11/00
[52] U.S. Cl. ..................................... 29/428; 29/773; 29/786; 29/789; 113/28
[58] Field of Search ................. 53/302, 303; 113/1 E, 113/30, 28; 29/771, 773, 777, 785, 786, 789, 790, 428

[56] References Cited

U.S. PATENT DOCUMENTS

| | | | |
|---|---|---|---|
| 804,642 | 11/1905 | Walsh | 113/28 |
| 2,104,224 | 1/1938 | Fisher | 113/28 |
| 2,698,478 | 1/1955 | Heisterkamp et al. | 29/785 |
| 3,994,059 | 11/1976 | Watson | 29/773 |

*Primary Examiner*—Lowell A. Larson

*Attorney, Agent, or Firm*—Richard D. Heberling; Myron E. Click; David H. Wilson

[57] ABSTRACT

A method and apparatus are disclosed for mounting a cup-shaped support base onto a convex bottom of a container. The apparatus includes adjacent wheels mounted for rotation about angularly related, non-parallel axes, so that the wheels are closer to one another in one circumferential region than in any other such region. In the method, a container is retained on the periphery of one wheel for displacement along a partial-circumferential path. A cup-shaped support base is retained on a second wheel in alignment with a convex bottom on the container. As the wheels rotate, the base and container are displaced in unison to said one circumferential region, with the base progressively moving closer to the convex bottom for their telescopic assembly. An abutment surface, which may be on a third wheel, engages an opposed end on the container while the container is displaced during the final portions of said partial-circumferential path, in order to resist axial displacement of the container as the base is assembled to its convex bottom.

17 Claims, 7 Drawing Figures

METHOD AND APPARATUS FOR ASSEMBLING A SUPPORT BASE TO THE BOTTOM OF A PLASTIC CONTAINER

BACKGROUND OF THE INVENTION

The present invention and disclosure relate generally to a method and apparatus for assembling two separate articles, and more particularly to a method and apparatus for telescopically assembling a cup-shaped support base on a convex end of a plastic bottle.

Blown plastic bottles for carbonated beverages are most preferably formed with a convex, essentially semi-spherical bottom in order to withstand the internal beverage pressures. Since this particular bottom configuration, and others like it, do not permit a bottle to stand upright, it has become necessary to attach a separate support base to the bottle bottom. Such an assembly operation is basically one of telescoping the support base onto the bottle bottom by moving the two components toward each other.

Various machines have been used in the prior art where this general type of motion is employed. However, for the most part, these machines have included hydraulic cylinders, cams, cam followers and other auxiliary equipment, which (1) are relatively failure prone, (2) are overly expensive, and (3) require upkeep, maintenence, repair, and operator attention.

SUMMARY OF THE INVENTION

The present invention overcomes these prior art problems in an apparatus including a first rotary wheel which conveys a plurality of containers in succession along a first arcuate path in a first plane substantially perpendicular to the longitudinal axes of the containers. A second rotary wheel successively conveys a plurality of cup-shaped support bases in alignment with respective containers, so that the bases travel along a second arcuate path in a second plane which intersects the first plane. With this arrangement, respective bases and containers converge during their displacement on the rotary wheels to progressively telescopically assemble the bases on the convex container ends.

An optional third rotary wheel includes a plurality of circumferetially spaced abutments, which are conveyed in succession along a third arcuate path in a plane which intersects both the first and second planes. By this arrangement, the abutments respectively engage a second end on the containers during a portion of their displacement to resist axial movement of the containers away from the bases during their telescopic assembly.

In the disclosed apparatus, the first, second, and third rotary wheels are essentially vertical, with the angle between the first and second planes being about 3° and the angle between the first and third planes being about 0.5°.

The abutments may optionally include fluid supply means to inject air under pressure into the interior of the containers so that the containers do not buckle during their telescopic assembly with the bases. In this arrangement, each abutment includes an abutment plate arranged generally parallel to the plane of the third wheel. A rod is attached to the abutment plate and extends through a closely fitting opening in the third rotary wheel. A stop is provided on the opposed end of the rod within an enclosed chamber defined by a cup-shaped end cap, with a compression spring being interposed between the abutment plate and the third wheel to bias the abutment plate away from the third wheel. The rod includes a plurality of radial openings adjacent the stop, and an axial bore communicating with the radial openings and being in alignment with an opening in the abutment plate. The radial openings are normally positioned within the opening in the wheel but are displaced into the chamber when the abutment plate is axially displaced in response to engaging a container. Air supply means continuously supplies air under pressure into the cup-shaped end cap, so that fluid under pressure is supplied to the interior of the container by the opening in the abutment plate when the radial openings are displaced into the chamber.

In the method, a cup-shaped base is conveyed along an arcuate path in alignment with a container having a convex bottom, the container being simultaneously conveyed in a separate, adjacent arcuate path. During this displacement, the opening in the cup-shaped base faces the convex bottom of the container and the central axes of the container and base are essentially parallel to the respective axis of the arcuate paths. As the base and container are conveyed along their respective arcuate paths, they are relatively displaced toward each other to telescopically assemble the base onto the convex container bottom. In the disclosed arrangement, the arcuate paths are included in respective planes which intersect, so that the base and container are progressively moved toward each other during their displacement until the base is fully telescoped onto the convex bottom.

In an optional mode of operation, an abutment surface is displaced along a third arcuate path in alignment with a second end on the container, the third arcuate path being included in a plane which intersects the other planes of movement. As the abutment surface is displaced, the second end of the container and the abutment surface are relatively moved toward each other until they engage, which serves to resist axial displacement of the container away from the base during the telescopic assembly of the base onto the convex container bottom.

Accordingly, the present invention provides both a method and apparatus which accommodates high ouput production rates of support bases attached to containers, on the order of approximately 200 assembled untis per minute. Further, the apparatus eliminates many mechanical parts, such as hydraulic cylinders, cams and cam followers, which were required in various other prior art equipment to achieve the same type of assembly operations. Through the eliminations of these other mechanical parts, the present invention is less expensive, less failure prone, and requires less upkeep, maintanence and repair.

These and other meritorous features and advantages will be more fully appreciated by the following detailed description and the appended clams.

DETAILED DESCRIPTION OF THE PREFERRED EMBODIMENTS

In general, the drawings illustrate that the disclosed invention includes a conveyor 20 which receives bottles 10 from a feed 14 (shown schematically) and support bases 16 from a feed chute 18. The conveyor then transports the bottles and bases in succession to an assembly mechanism 100, which includes three rotary wheels 110, 140 and 170, as more fully described in the following portions of this disclosure.

Figure 2:
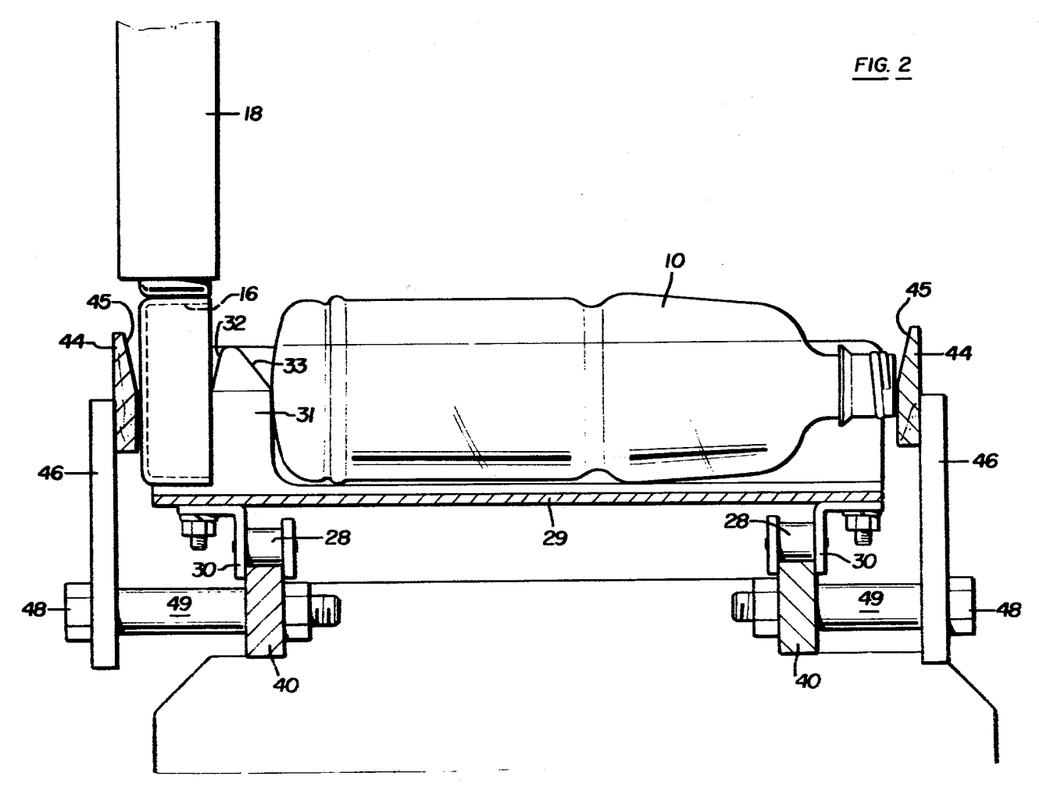
FIG. 2 is a sectional view taken along plane 2—2, as shown in FIG. 1, illustrating the base and container on the conveyor system.

As shown best in FIG. 2, the present invention is intended primarily for use in assembling a cup-shaped base to a convex bottom on a bottle, the base having a peripheral head which fits into a groove in the periphery of the bottle. However, the invention is intended for use with other types of components where an attachment is assembled to a primary article.

The conveyor 20 includes a pair of horizontally spaced beams 22, only one of which is shown in FIG. 2, the other being positioned in a direction into the sheet of the drawing. A pair of drive sprockets 24, only one being shown, are mounted on a shaft 25 for rotation and are driven by a conventional motor arrangement (not shown). At the other end of the horizontal beams 22 are a pair of idlers sprockets 26 rotationally mounted on a shaft 27. A pair of continuous chains 28 encircle each respective set of drive and idler sprockets and have a plurality of spaced conveyor cups 29 attached thereto by mounting brackets 30 shown in FIGS. 2 and 3.

Figure 3:
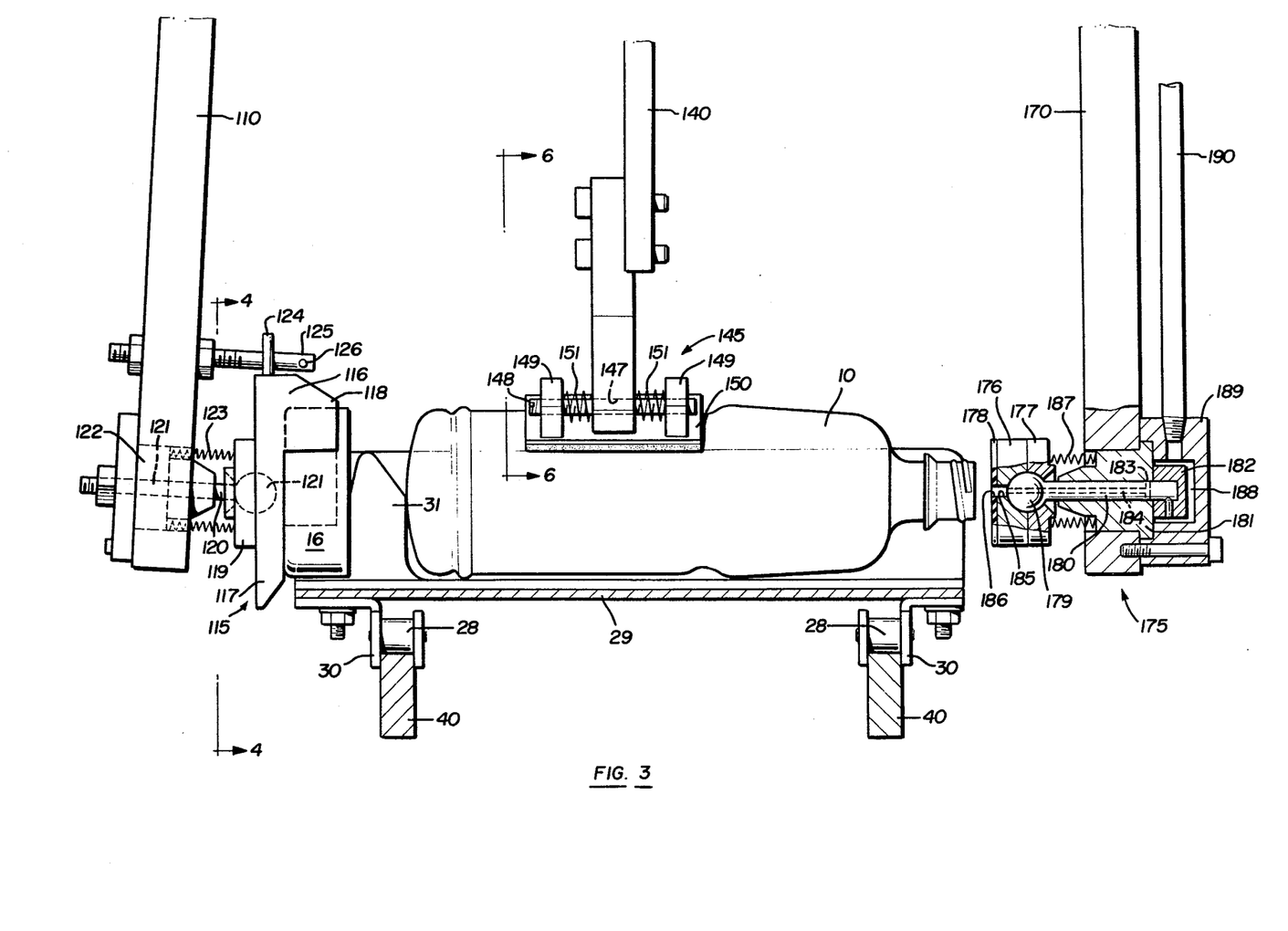
FIG. 3 is a sectional view taken along plane 3—3, as shown in FIG. 1, illustrating the base and container on the conveyor system as they are picked up by the assembly mechanism.

Each conveyor cup 29 is generally semi-cylindrical in cross section to receive a bottle 10 and a base 16, which are separated by a divider 31 having beveled surfaces 32 and 33 to guide a base 16 from chute 18 and a bottle 10 from feed 14 into proper placement.

A horizontal guide rail 40 is mounted to each horizontal beam 22 by a plurality of vertical posts 42, the guide rails being engaged by the links of the chains 28 for guidance, as the chains are displaced horizontally between the feed 14 and the assembly mechanism 100. Horizontal elongated end rails 44 are mounted by vertical beams 46, bolts 48, and spacer sleeves 49 to the guide rails 40, as shown in FIG. 2, to maintain the bases 16 and bottles 10 in their respective pockets of the conveyor cups 29. In order to facilitate the proper placement of the bottles and cups in the conveyor cups, the end rails 44 include beveled surfaces 45.

In operation, sprockets 24 are rotated by an appropriate power means to drive the conveyor chains 28 and attached conveyor cups 29 in a continuous path around each of the drive and idler sprockets 24 and 26. As the conveyor cups are displaced underneath feed 14, bottles 10 are dispensed in succession into each subsequently carrier cup 29. Likewise, as the conveyor cups pass underneath feed chute 18, support bases 16 are dispensed in succession into each separate carrier cup, as shown in FIG. 2.

Accordingly after being placed within the appropriate pocket of each respective carrier cup 29, a cup-shaped support base 16 and bottle 10 are conveyed along generally parallel axial paths toward the assembly mechanism 100, which will telescopically assemble the base into the convex end of the bottle 10. As will be appreciated, these axial paths of displacement are tangent to respective arcuate paths along which the bottles and bases will be conveyed by the assembly mechanism 100.

Figure 5:
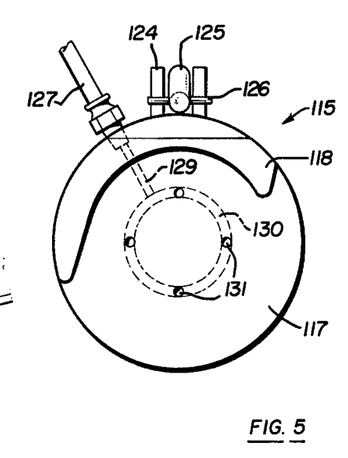
FIG. 5 is a side elevational view, illustrating the reverse side of the base carrier structure from that shown in FIG. 4.
Figure 6:
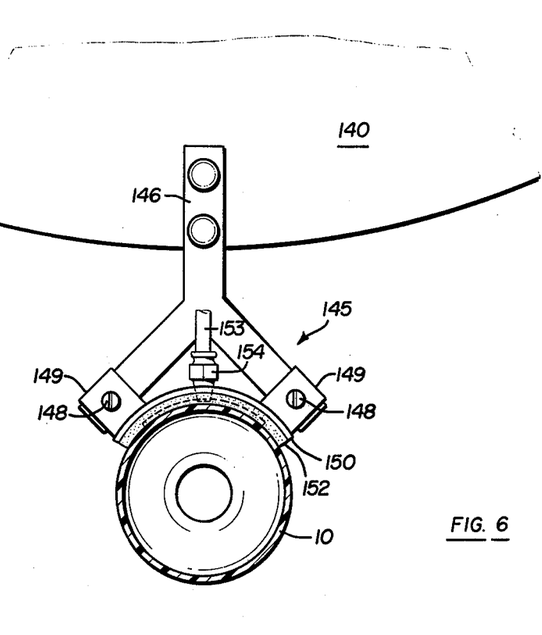
FIG. 6 is a sectional view taken along plane 6—6, as shown in FIG. 3, illustrating the details of the container carrier structure of the assembly mechanism.
Figure 7:
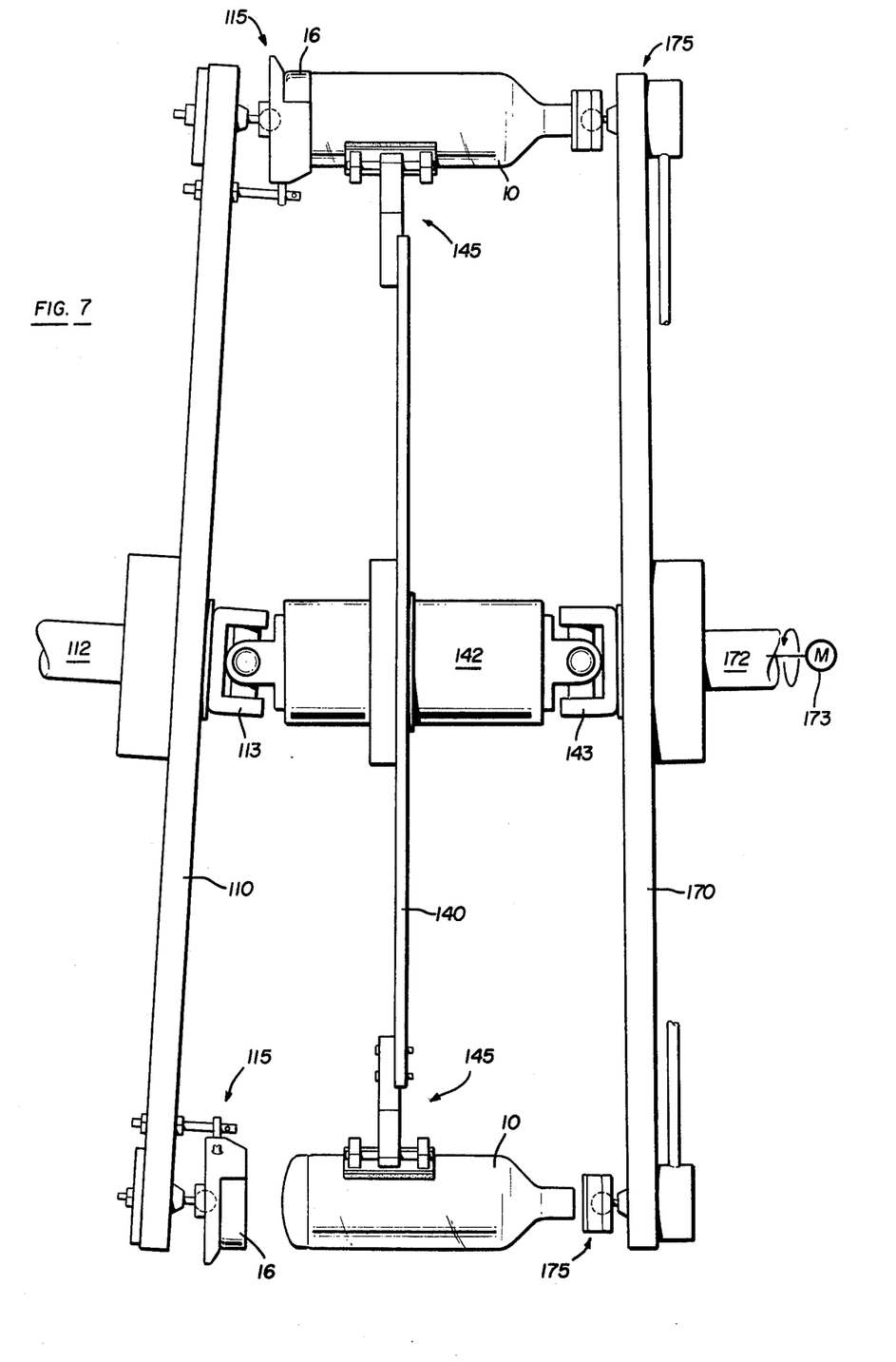
FIG. 7 is a side elevational view, illustrating the relative positions of the assembly mechanism at the position where the container and base are picked up from the conveyor system and at the position where the base is fully telescoped onto the bottom of the container.

Turning now more particularly to FIGS. 3-7, the assembly mechanism is shown primarily as including two primary rotary wheels 110 and 140 and a third optional, but desirable, wheel 170. As will be appreciated, wheel 170 is needed in those situations where the forces generated during the telescopic assembly of bottle 10 and base 16 tend to dislodge the bottle from its position on wheel 140. All three wheels are rotationally mounted on rotary shafts 112, 142 and 172, as shown in FIG. 7, which shafts are supported by conventional rotational mounting structure (not shown). As will become more apparent from the following disclosure, the shafts are not coaxial, but are mounted on axes which intersect, such that the peripheries of the wheel are spaced further apart at the bottom near the conveyor 20 than at the top, as viewed in the figures. In the preferred embodiment, the central rotary wheel 140 is vertical and its axes of rotation is horizontal. Wheel 110 is offset from the vertical by about 3°, and correspondingly its axis of rotation forms an angle with the rotational axis of wheel 140 of about 3°. Wheel 170 is offset from the vertical by about 0.5°, and correspondingly its axis of rotation forms and included angle with the rotational axis of wheel 140 of about 0.5°. It will be understood that these angles may be varied as desired in relationship to the diameter of the wheels.

To accommodate the intersecting axes of rotation, yet to permit the wheels to be driven by a common source, universal joints 113 and 143 respectively interconnect shaft 142 with wheels 110 and 170. A rotational output motor 173, shown schematically in FIG. 7, is interconnected with shaft 172 to rotate the entire assembly mechanism 100.

Rotary wheel or disc 110 includes a plurality of peripheral, circumferentially spaced support base carriers 115 to pick up the support bases from the conveyor 29 as shown in FIG. 3. Each of these carriers includes a cup 116 which is comprised of an end plate 117 and a partial peripheral flange 118, shown best in FIG. 5, to support each base 16 during its displacement by wheel 110.

Each cup 16 is secured to a mounting plate 119, through which a rod 120 of a ball joint 121 extends, with the cup and mounting plate each having an essentially semi-spherical pocket to receive the ball joint 121. The rod 120 is threadedly received through an opening 121 in an essentially cylindrical retainer block 122, which is appropriately secured within a cylindrical opening in wheel 110. An annular compression spring 123 is interposed between the mounting plate 119 and the retainer block 122 to bias the cup 116 to a position where the end plate 117 is normally parallel with the plane of the wheel 110. Additionally, a pair of spaced ears extend from each cup 116 on opposed sides of an adjustable guide rod 125 threadly secured to wheel 110, in a manner such that cup 116 may pivot only in a plane perpendicular to the wheel 110 through guide rod 125. A transverse stop pin 126 near the end of guide rod 125 limits the extent of pivotal movement of the cup 116 in the clockwise direction, as viewed in FIG. 3.

Figure 4:
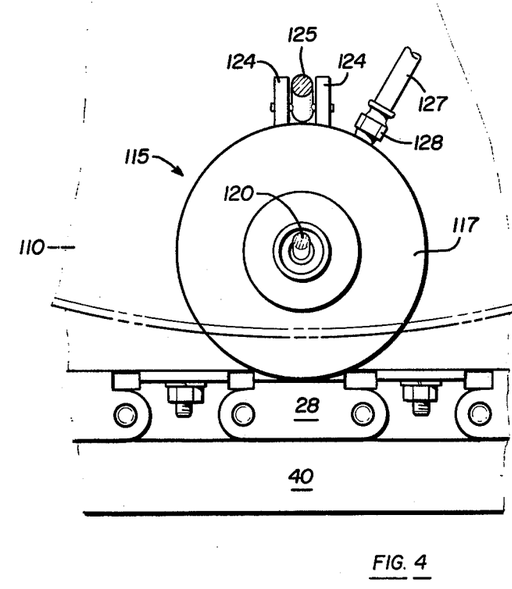
FIG. 4 is a sectional view taken along plane 4—4 as shown in FIG. 3, illustrating the details of the base carrier structure on the assembly mechanism.

As shown in FIGS. 4 and 5, a vacuum line 127 is interconnected by a coupling 128 to each of the support base carriers 115, which includes a generally radial internal passageway 129 communicating with an internal annular passageway 130. A plurality of essentially circumferentially spaced suction ports 131 extend from the annular passageway 130 through the face of end plate 117, thus accommodating the application of a vacuum against the bottom surface of the cup-shaped bases 16 for the purpose of holding and retaining the bases during their displacement by the wheel 110. Vacuum line 127 selectively establishes the vacuum by way of suitable valve means (not shown) such as rotary couplings on shaft 112 as is somewhat conventional.

In operation, each circumferentially spaced base carrier assembly 115 is rotated by wheel 110 in succession into engagement with a support base 16 on a conveyor cup 129 as shown in FIG. 3. Immediately prior to each carrier 115 engaging a base 16, the carrier assembly will be biased to a position by compression springs 123 so that base plate 117 is essentially parallel to the plane of wheel 110. As each carrier assembly rotates into the region of the conveyor 20, it will engage a support base 16 and pivot to the position illustrated in FIG. 3. At about the same time that the carrier structure 115 engages the base 16, a vaccum will be pulled by line 127 through passageways 129, 130 and 131 to retain the support base 16 against the end plate 117. During continued rotation of wheel 110, each carrier structure 115 displaces a respective support base 16 along an arcuate or partial-circumferential path in alignment with a bottle 10 which is simultaneously retained on carrier structure attached to the circumferential periphery of wheel 140. During that rotational movement, the base 16 and convex bottom of the bottle 10 are relatively moved toward each other to telescopically insert the base 16 onto the bottom bottle 10. As will be more fully appreciated from following portions of this disclosure, full telescopic assembly is achieved at the "12 o'clock" position of the assembly mechanism 100, as viewed in FIG. 1. Also, after each carrier assembly 115 picks its respective base 16 up from the conveyor 20, the compression spring 123 will bias the carrier assembly to a position where the end plate 117 is generally parallel with disc 110, or in other words to a position where the central axis of the base 16 is essentially parallel with the rotational axis of disc 110. End plate 117 is then swiveled back to a position essentially parallel with wheel 140 during the telescopic assembly of the base 16 to the bottle 10.

Rotary wheel 140 includes a corresponding number of peripheral, circumferentially spaced container carrers 145 for the purpose of picking up containers 10 in succession from the conveyor 20 and then displacing the containers along an arcuate or partial circumferential path in alignment with a corresponding support base 16. These container carriers 145 include a Y-shaped mounting arm 146 as shown in FIG. 6, which is suitably secured to the periphery of the wheel 140. Each leg of arm 146 includes an opening 147 through which a rod 148 is slidably inserted. Each end of the rods 148 is secured to a projecting tab 149 on each side of an arcuate elongated carrier sleeve 150. Compression springs 151 are interposed between each tab 149 and the Y-shaped mounting arm 146 to permit limited axial displacement of the sleeve 150 relative to the wheel 140 yet to bias the sleeve 150 to a normal position.

Each carrier sleeve 150 has a layer of sealant material 151, such as rubber, attached to its internal surface to engage the external surface of a bottle 10 and to accommodate the establishment of a vacuum to retain the bottle on the carriers 145. As shown in FIG. 6, the sealant 151 is recessed in its central region to accommodate the vacuum, which is established by a vacuum line 153 that is attached to the carrier by a coupling 154. As with vacuum line 127, a suitable valving mechanism selectively draws a vacuum to retain a bottle on the carrier mechanism 145. Such a suitable valving mechanism (not shown) may consist of rotary couplings on shaft 142, as are conventional in the art.

Figure 1:
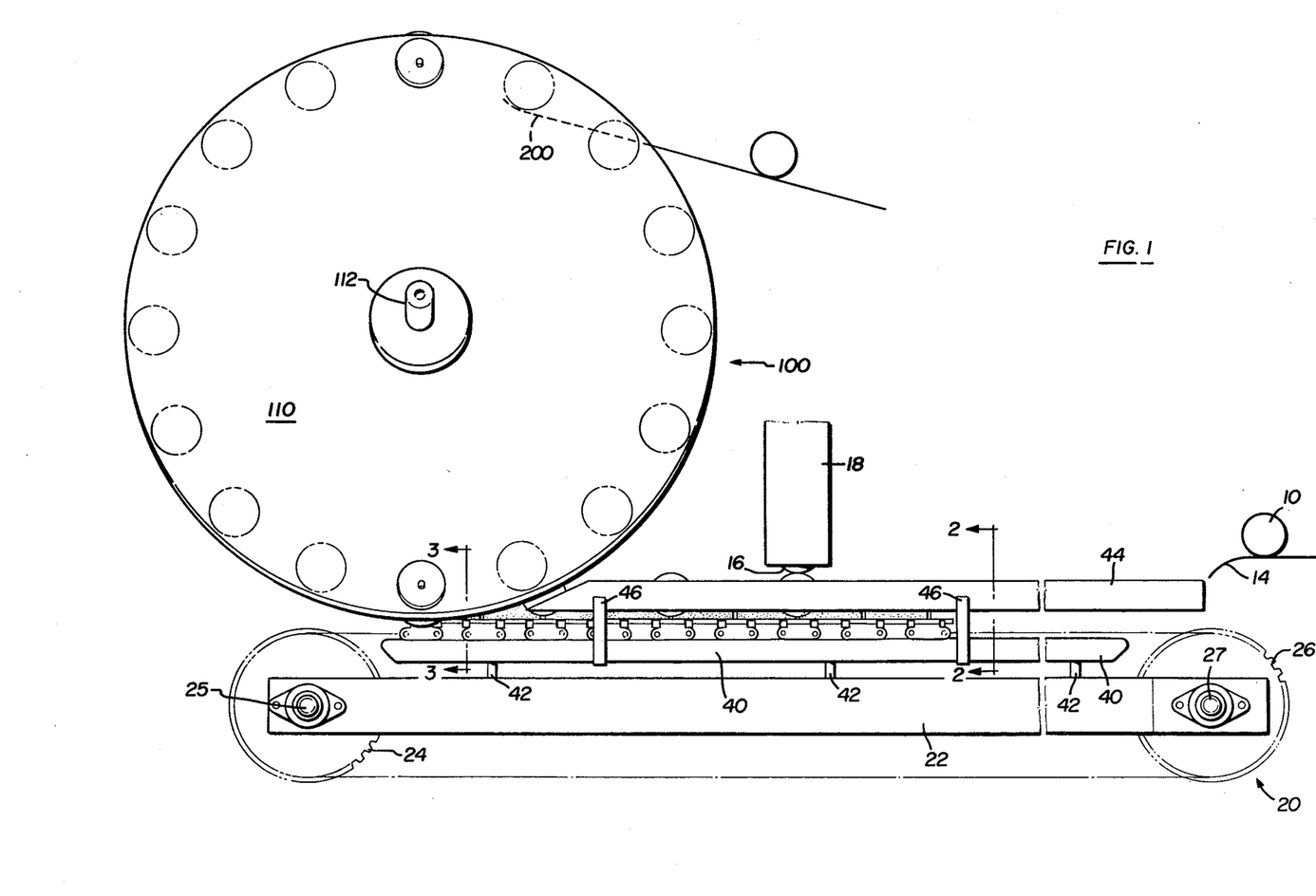
FIG. 1 is a side elevational view of the assembly mechanism of this invention and a conveyor system which displaces the containers and bases to the assembly mechanism.

In operation, wheel 140 displaces each circumferentially spaced container carrier 145 into engagement with successive bottles 10 on the carrier cups 29 at the "6 o'clock" position of the assembly mechanism 100, as viewed in FIG. 1. As will be understood, that position corresponds to the position shown in FIG. 3 and to the position shown at the bottom of FIG. 7. At about the time that the container carrier 145 engages a bottle, the suitable valving mechanism draws a vacuum through line 153 to establish a vacuum between the external surface of a bottle 10 and the sealant 152 in order to hold the bottle in position during displacement along an arcuate path while retained on wheel 140. During its displacement along the arcuate path, each bottle 10 is essentially in axial alignment with a respective cup-shaped support base 16, the container 10 and base 16 being progressively moved toward each other during their displacement to achieve a telescopic assembly of the base onto a convex end of the bottle.

The third rotary wheel 170 includes a corresponding plurality of circumferentially spaced abutment assemblies 175 which engage the opposed end of bottle 10 during its displacement along the arcuate path, the abutment assembly 175 serving to resist axial displacement of the bottle 10 away from the support base 16 during their telescopic assembly.

Each abutment assembly 175 includes a mounting plate 117 suitably secured to an abutment plate 176 to which an abutment pad 178 is secured. The abutment pad is comprised of a leather material in the most preferred embodiment, but may be comprised of any suitable material, such as rubber, which will withstand repeated engagement with the annular end portion of a bottle.

Both the abutment plate 176 and the mounting plate 177 include an essentially semi-spherical recess in engagement with a ball joint 179, serving as a universal joint. The ball 179 is integral with a rod 180 which freely extends through an opening in an essentially cylindrical retainer block 181 secured to the wheel 170. An end cap 182 is secured to the end of rod 180 and is housed within a cavity 188 formed by a cup-shaped end cap 189, which is also secured to the wheel 170. A pressure line 190 constantly provides air under pressure to the cavity 188 for a purpose which will become apparent from the following disclousre.

Radial supply ports 183 adjacent the end cap 182 communicate with an elongated axial bore 184 in the rod 180 and ball 179. The axial bore 184 is in general alignment with an opening 185 in abutment plate 176 and with an opening 186 in abutment pad 178. An annular compression spring 187 interposed between the retainer block 181 and the mounting plate 177 normally biases the rod 180 to a position where the radial ports 183 are within the opening in the retainer plate 181 rather than in communication with the air under pressure in the internal cavity 188. As will be appreciated, upon axial displacement of the abutment plate 176, the mounting plate 177, the ball 179, and the rod 180 as a unit, the radial ports 183 are displaced into the internal cavity 188, whereupon air under pressure flows through bore 184 and openings 185 and 186. Such an axial displacement of these component parts occurs after pad 178 engages the end of a bottle during the rotation of the assembly mechanism 100. The air under pressure from line 190 may be on the order of about three to four psi and is used generally only in those situations where the bottle 10 is comprised of a material which buckles under pressure. As will be appreciated, the air under pressure from opening 186 is supplied to pressurize the interior of the bottle to resist such buckling.

In operation, the wheel 170 rotates at the same speed of wheels 110 and 140 so that each abutment assembly 175 is displaced along an arcuate path in alignment with an opening in the container 10. As shown in FIGS. 3 and 7, the abutment assembly is axially spaced from the container at the "6 o'clock" position of the assembly mechanism 110, i.e., at the position where a container and base are picked up from the conveyor 20. As the non-parallel wheels 140 and 170 rotate, each respective abutment assembly 175 progressively moves toward a bottle 10 until the two engage each other at about the "9 o'clock" position, as viewed in FIG. 1. This is at about the same time that the base 16 first engages the convex end portion of the bottle 10. During the continued rotation from the "9 o'clock" position to the "12 o'clock" position, the bottle and retainer sleeve 150 remain essentially stationary, but slight axial displacement of these components may occur as the base 16 is telescoped onto the bottom of the bottle. Such limited axial movement is accommodated by rods 148 and compression springs 151, so that the bottle preferably does not move relative to the sealant pad 152 to disturb the vacuum. During that rotation from the "9 o'clock" to the "12 o'clock" position, rod 180 is displaced agains the biasing force of compression springs 187 to position radial ports 183 in the internal pressure cavity 188. If a relatively thick-walled, non-collapsbile container is being conveyed, air under pressure may not be supplied through line 190. However, if a thin-walled container is being assembled, air under pressure may be supplied through line 190 to internal cavity 188, then through radial ports 183, longitudinal bore 184 and openings 185 and 186 into the interior of the bottle to pressurize it to resist buckling.

As each respective base carrier assembly 115, container carrier 145, and abutment assembly 175 reach the "12 o'clock" position of the assembly mechanism 100, as viewed in FIG. 1, each cup-shaped base 16 is fully telescoped onto the covex bottom of the respective bottle 10. It is at this point that the various assemblies 115, 145, and 175 are closest to one another with further rotation of the wheels past this region resulting in displacement of these respective assemblies away from each other. It is also at about this point where the valving mechanisms shut off the vacuum to carrier assemblies 115 and 145 to release each assembled base and container to facilitate their removal from the assembly mechanism 100. As shown schematically in FIG. 1, the removal of these assembled parts is effected by a ramp 200 at a position about 22½°, i.e., about 1/16th of a circumference, past the "12 o'clock" position.

As will be appreciated, between the "12 o'clock" and removal positions, the base and container are conveyed along an essentially common arcuate path along the periphery of wheel 145.

It will be understood that the foregoing description is exemplary in nature rather than limiting. For example, the application of pressurizing fluid from the abutment assembly 175 is necessrary only when the container 10 is subject to collapse or buckling. Additionally, the abutment assembly 175 may be eliminated in certain situations. Moreover, even though the present invention has been described primarily in relationship to a bottle or container, it may be used with equal success with other articles to which an attachment is affixed. Accordingly, the invention is to be limited only by the following appended claims and their legal equivalents.

I claim:

1. In a method of attaching a cup-shaped support base to a convex bottom of a container, the steps of:
   conveying a cup-shaped base along an arcuate path, simultaneously and separately conveying a container having a convex bottom aligned with said base in a separate, adjacent angularly related arcuate path, the opening in the cup-shaped base facing the convex container bottom and the central axes of the container and base being essentially parallel to the respective axes of the arcuate paths; and
   as the base and container ae conveyed along their respective arcuate paths, relatively axially displacing the base and the container toward one another while accommodating pivotal movement of the base into axial alignment with the axis of the container to telescopically assemble the base onto the convex container bottom.

2. The method as defined in claim 1, further including the steps of displacing an abutment surface along a third arcuate path in alignment with a second end on the container, with the third arcuate path being included within a plane which intersects the other planes of movement; and during the displacement of the abutment surface, (a) relatively moving th second end of the container and the abutment surface toward each other and (b) engaging the second end of the container with the abutment surface to resist axial displacement of the container away from the base during the telescopic assembly of the base onto the convex container bottom.

3. The method as defined in claim 2, wherein the container is comprised of a collapsible thermoplastic material, the second end of the container includes an opening, and the abutment surface includes a fluid supply passageway in alignment with the container opening, characterized by supplying fluid under pressure through the fluid passageway in the abutment to the interior of the container after engagement between the abutment and the container second end, in order to pressurize the interior of the container to resist its collapse during the telescopic assembly of the base and convex container bottom.

4. An assembly method, comprising the steps of:
   (1) simultaneously, (A) conveying an article having a first convex end along a first essentially planar path of movement, with the central longitudinal axis of the article being essentially perpendicular to the planar path of movement and (B) conveying a concave support base along a second essentially planar path which is spaced from and substantially parallel to the first path, with the concavity of the base facing the convex end of the article and with the central longitudinal axis of the base being essentially coaxial with the central axis of the article;

(2) simultaneously (A) conveying the article along an arcuate path in the plane of said first path and (B) conveying the support base along a second, different arcuate path in a second plane which is angularly related to the second planar path and which converges toward the first plane;

(3) during the performance of Step (2), and as a result of the convergence of said arcuate paths relatively displacing the concave base and the convex end toward each other to telescopically assemble the base on the convex article end; and (4) during the performance of Step (2) conveying an abutment along a third, different arcuate path in alignment with a second end of the article, with the third arcuate path being included in a plane which intersects the first plane; and engaging the second article end with the abutment to resist displacement of the article away from the base during their telescopic assembly.

5. The method as defined in claim 4, wherein the article is hollow, is comprised of a collapsible material, and includes an opening in the second end, and wherein the abutment includes a fluid passageway in alignment with the opening in the article, characterized by pressurizing the interior of the article by supplying fluid under pressure through the passageway in the abutment, in order to resist collapse of the article during the telescopic assembly of the base on the convex article end.

6. A method of telescopically assembling a multitude of cup-shaped support bases onto respective convex ends of thermoplastic bottles, by the steps of:

(1) simultaneously, (a) retaining thermoplastic bottles in succession on first respective carrier assemblies secured to a first rotary wheel, by applying a vacuum to an exterior surface on each of the bottles by the respective first carriers, and (b) retaining cup-shaped bases in succession on second respective carrier assemblies secured to a second rotary wheel, by applying a vacuum to an exterior surface on each of the bases by the respective second carriers;

(2) simultaneously, (a) successively conveying the bottles, as retained on the first carrier assemblies, along a first partial-circumferential path in response to rotation of the first wheel, (b) successively conveying the bases, as retained on the second carrier assemblies, along a second and different partial-circumferential path in axial alignment with the convex ends of respective bottles, in response to rotation of the second wheel, and (c) successively conveying a plurality of abutments secured to a third rotary wheel along a third and different partial-circumferential path in alignment with opposed ends on the respective bottles, the partial-circumferential paths essentially lying within respective, different planes which converge in the direction of movement of the bottles, bases, and abutments; and (3) during the performance of (2), relatively displacing the respective bases and convex bottles ends toward each other for their telescopic assembly, and (b) relatively displacing the respective abutments and container finish ends toward each other for their engagement in order to resist axial movement of the bottles away from the bases during their telescopic assembly.

7. The method as defined in claim 6, further including the steps of removing the bottles with telescopically attached bases in succession from the rotary wheels after the performance of Step (3); and in response to the rotation of the first, second and third wheels, (a) displacing the respective first and second carrier assemblies and the abutments along respective partial-circumferential paths in said respective planes in a direction where the planes are diverging, and (b) relatively moving the respective first and second carrier assemblies and the abutments away from each other preparatory to receiving subsequent bottles and bases for their assembly.

8. The method as defined in claim 6, further including the step of displacing the abutments against a biasing force in a direction away from the respective bases after the abutments engage the respective opposed ends on the bottles; and in response to the displacement of the abutments, flowing fluid under pressure through an opening in each of the abutments and into the interior of the respective bottles in order to pressurize the interior of the bottles to resist buckling under the pressure of the telescopic assembly of the bases and convex bottle ends.

9. An apparatus for telescopically assembling cup-shaped support bases on convex ends of respective containers, comprising:

first rotary means for conveying a plurality of containers in succession along a first arcuate path essentially in a first plane which is substantially perpendicular to the longitudinal axes of the containers;

second rotary means for conveying a plurality of cup-shaped support bases in successive alignment with respective containers along a second arcuate path essentially in a second plane which intersects the first plane, so that the bases and containers converge during their displacement to telescopically assemble the bases on the convex container ends; and a third rotary means including a plurality of circumferentially spaced abutments, said third rotary means conveying the abutments in succession along a third arcuate path essentially in a third plane which intersects the first plane, so that the abutments respectively engage a second end on the containers during their displacement to resist axial movement of the containers away from the bases during their telescopic assembly.

10. The apparatus as defined in claim 9, wherein the first, second and third rotary means are essentially vertical, characterized by the included angle of intersection between the first and second planes being about 3° and by the included angle of intersection between the first and third planes being about 0.5°.

11. An assembly apparatus for telescopically assembling a cupped attachment onto a generally cylindrical article, comprising:

a first rotary wheel rotationally mounted about a first axis and having a plurality of article-engaging means uniformly spaced around its circumferential periphery for engaging a plurality of the articles in succession to be conveyed by said first wheel along a portion of a first circumferential path; the articles each having their axes parallel to said first axis;

a second rotary wheel rotationally mounted about a second axis adjacent the first wheel and having a plurality of attachment engaging means uniformly spaced around its circumferential periphery in essential alignment with the article-engaging means for engaging a plurality of the attachments in succession to be conveyed by said second wheel along a portion of the second circumferential path;

the first and second axes intersecting and the first and second rotary wheels being non-parallel so that the article engaging means and the attachment engaging means converge during 180° of their rotational movement to relatively displace the article and the attachment toward each other for their assembly and means resiliently pivotally mounting each attachment engaging means to said second wheel to accommodate relative movement of said attachments into axial alignment with said article as the wheels rotate despite the non-parallelism of said wheels.

12. The assembly apparatus as defined in claim 11, further including a third rotary wheel rotationally mounted about a third axis adjacent the first rotary wheel, the first rotary wheel being between the second and third wheels, and the third rotary wheel including a plurality of abutments uniformly spaced around its circumferential periphery in essential alignment with the first conveyor means;

the first, second and third axes intersecting and being coplanar, and the first and third wheels being non-parallel, so that the abutment surfaces converge with the first conveyor means during 180° of their rotational movement in order for the abutment surfaces to engage and stabilize the respective articles during their assembly with the respective attachments.

13. The assembly apparatus as defined in claim 11, wherein each of the article engaging means comprises an arcuate, elongated retainer member for engaging a generally cylindrical medial portion of each article and including a fluid supply duct which is interconnected with a vacuum source to apply a vacuum to the exterior surface of the article for retaining the article on the article engaging means during rotation of the first wheel.

14. The assembly apparatus as defined in claim 13, wherein the retainer members are mounted for limited axial movement on the periphery of the first rotational wheel in a direction essentially parallel to the first axis, including a rod connected to each of the retainer members and extending through a close fitting opening in the first wheel adjacent its periphery, an abutment at each end of the rod, and compression springs interposed between each of the abutments and the rotary wheel to bias the retainer members during their limited axial movement.

15. The assembly apparatus as defined in claim 13, wherein each of the attachment engaging means comprises an end plate arranged generally parallel with the plane of the second rotary wheel, and including a plurality of suction openings facing toward the first wheel to apply a vacuum to the attachments in order to retain the attachments on the attachment engaging means during the rotation of the second wheel.

16. The assembly apparatus as defined in claim 12, wherein each of the abutments comprise an abutment plate arranged generally parallel to the plane of the third wheel, a rod secured to the abutment plate and extending through a closely fitting opening in the third wheel adjacent is periphery, wherein the opening is generally parallel to the rotational axis of the third wheel, a stop on the opposed end of the rod within an enclosed chamber defined by a cup-shaped end cap secured to the third wheel, a compression spring interposed between the abutment plate and the third wheel to bias the abutment plate away from the third wheel, with the axial length of the rod being sufficient to permit limited axial movement within the opening of the wheel, means to supply fluid under pressure to the enclosed chamber, the rod having an axial bore in alignment with an opening in the abutment plate and radial openings adjacent the stop, the radial openings being normally positioned within the opening in the wheel but being displaced into the chamber when the abutment plate is displaced in response to engaging the article, so that fluid under pressure is supplied to the interior of the article by the opening in the abutment plate, in order to pressurize the interior of the article to resist buckling during assembly with the attachment.

17. The assembly apparatus as defined in claim 11, wherein said means resiliently pivotally mounting said attachment engaging means comprises a universal joint interposed between each end plate and the second rotary wheel, a compression spring adjacent each such joint and also interposed between each end plate and said second rotary wheel, and stop means limiting plate-wheel movement about said joint.

* * * * *